(12) United States Patent
Martins

(10) Patent No.: US 6,608,615 B1
(45) Date of Patent: Aug. 19, 2003

(54) PASSIVE GAZE-DRIVEN BROWSING

(75) Inventor: Fernando C. M. Martins, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 228 days.

(21) Appl. No.: 09/663,962

(22) Filed: Sep. 19, 2000

(51) Int. Cl.$^7$ .................................................. G09G 5/00
(52) U.S. Cl. .............................. 345/156; 345/7; 345/8; 345/157; 345/158; 345/172; 345/520; 351/210; 351/211; 351/212; 351/222
(58) Field of Search ................................. 345/156, 157, 345/172, 520, 158, 7, 8; 351/210, 222, 211, 212

(56) References Cited

U.S. PATENT DOCUMENTS

| | | | |
|---|---|---|---|
| 5,220,361 A | * | 6/1993 | Lehmer et al. ............. 351/226 |
| 5,898,423 A | * | 4/1999 | Tognazzini et al. ......... 345/158 |
| 6,152,563 A | * | 11/2000 | Hutchinson et al. ........ 351/209 |
| 6,246,779 B1 | * | 6/2001 | Fukui et al. ................ 382/103 |
| 6,282,553 B1 | * | 8/2001 | Flickner et al. ............. 708/141 |
| 6,351,273 B1 | * | 2/2002 | Lemelson et al. .......... 345/786 |

OTHER PUBLICATIONS

C.H. Morimoto; D. Koons; A. Amir; M. Flickner Frame-Rate Pupil Detector and Gaze Tracker, pp. 1–5, IBM Almaden Research Center San Jose, CA USA.

* cited by examiner

Primary Examiner—Richard Hjerpe
Assistant Examiner—Abbas Abdulselam
(74) Attorney, Agent, or Firm—Steven P. Skabrat

(57) ABSTRACT

Passively tracking a user's eye gaze while the user is browsing a web page and modifying the presentation of the web page to the user based on the tracked gaze. By combining historical information about a user's direction of gaze on individual cached web pages, a browser may be enabled to represent regions of a web page that have been previously glanced at by the user in a modified manner. For example, sections of a web page that a user has previously read or viewed may be represented in a changed form, such as in a different color, brightness, or contrast, for example. In one embodiment, the portions of the web page previously viewed by the user may be represented as "grayed out" so as to be unobtrusive.

27 Claims, 6 Drawing Sheets

PASSIVE GAZE-DRIVEN BROWSING

BACKGROUND

1. Field

The present invention relates generally to human computer interfaces (HCIs) and, more specifically, to interaction between a user's eyes and a computer display.

2. Descriptioon

Robust tracking of facial features may become fundamental to future human computer interaction. Reliable techniques for detecting movement of a user's lips and eyes are examples. The requirement for real-time interaction of the user with a computer imposes severe constraints on the response time of these image processing systems, which are also known to have high computational demands. Most current research on real-time detection and tracking of facial features are typically model-based, i.e., they use information about skin color or face geometry, for example. Some developed systems are used in command and control systems that are active and intrusive. Other research explores the physical properties of eyes (such as their retro-reflectivity) to passively track the eyes using an active illumination scheme. Utilization of eye properties have been used in several commercial eye gaze trackers, such as those available from ISCAN Incorporated, Applied Science Laboratories (ASL), and LC Technologies, for example. However, these gaze trackers typically use only bright or dark pupil images for tracking.

Due to the retro-reflectivity and geometry of the eye, a camera sees a bright pupil image when a light source is placed very close to its optical axis. This effect is well known as the red-eye effect from flash photography. Under regular illumination (when the light source is not on the camera's optical axis), a dark pupil is seen. One technique for robust pupil detection is to use active illumination systems to generate dark and bright pupil images. Pupil candidates are detected from the thresholded difference of the dark pupil image and the bright pupil image.

Some pupil detection systems are based on this differential lighting with thresholding scheme. These systems are used to detect and track the pupil and estimate the point of gaze, which also requires the detection of corneal reflections created by the light sources. The corneal reflection from the light sources can be seen as a bright spot close to the pupils (corneal glint). The point of gaze may be virtually extended to pass through the plane of a computer display surface so that screen coordinates may be identified for a current user gaze. Once the point of gaze of a user may be estimated, new methods of human computer interaction may be developed.

BRIEF DESCRIPTION OF THE DRAWINGS

The features and advantages of the present invention will become apparent from the following detailed description of the present invention in which.

DETAILED DESCRIPTION

Web pages for information portals on the World Wide Web (WWW) have become crowded with information. In many cases, it may be very difficult for a user who visits a web site in many short bursts of time during a day to keep track of what he or she has already viewed, compared to the information that is new and has not yet been viewed. Sequential visual scanning of lines of text or blocks of information by the user is inefficient and error prone, particularly for text-intensive information portals. In many instances, various news items are not considered to be interesting or important enough to select (e.g., click through), but the news item and its associated link keep attracting the attention of the user during subsequent visits to the web page. In addition, banner ads and other advertising attempt to distract the user from the core portal content and gain the user's attention, but once the user figures out the screen format of a particular web page, the user simply stops looking at the regions of the screen containing the ads.

The present invention helps to overcome some of these defects in traditional web browsing by tracking the user's eye gaze while the user is browsing a web page and by modifying the presentation of the web page to the user based on the tracked gaze. By combining historical information about a user's direction of gaze on individual cached web pages, a browser may be enabled to represent regions of a web page that have been previously glanced at by the user in a modified manner. For example, sections of a web page that a user has previously read or viewed may be represented in a changed form, such as in a different color, brightness, or contrast for example, although other changes are also within the scope of the present invention. In one example, the previously viewed portions may be represented as a diffused gray scale image that appears unobtrusive to the user ("grayed out"). In subsequent visits by the user to the web page, the regions that have already been seen (and not updated since the last visit) may be progressively faded out. After repeated visits, some of the oldest viewed content may appear to vanish and no longer be visible on the web page. In this way, embodiments of the present invention provide a passive gaze-driven, non-intrusive focusing mechanism for use in more efficiently viewing web pages.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
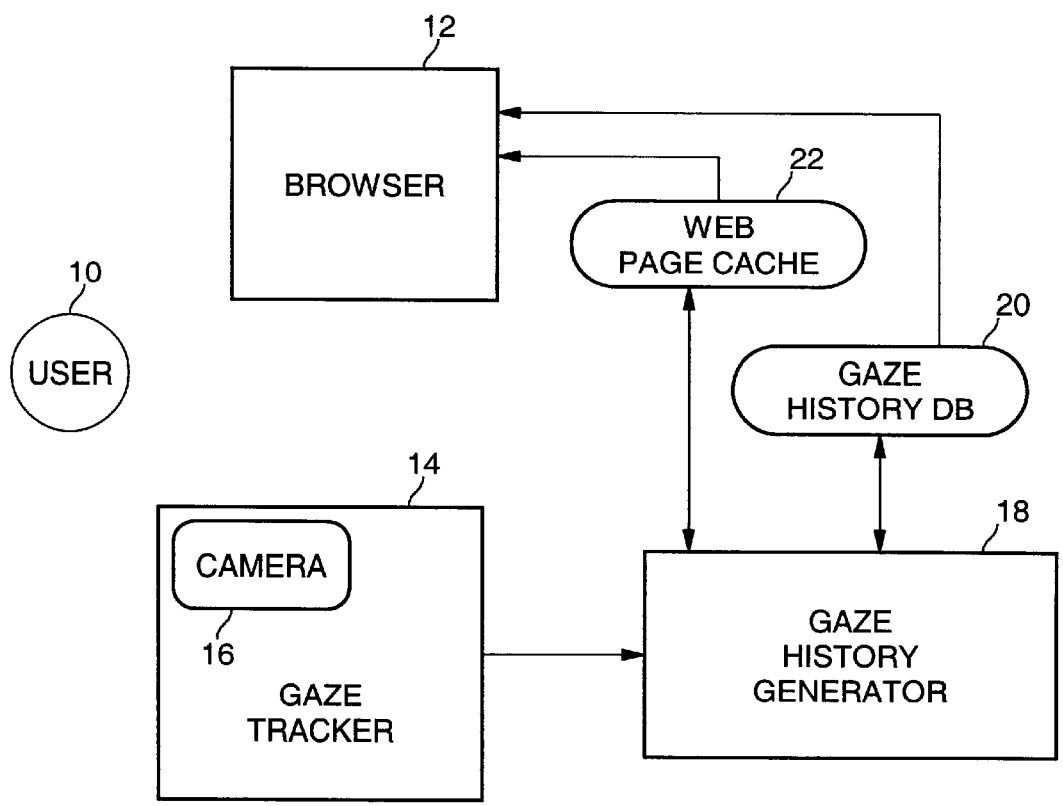
FIG. 1 is a diagram of a passive gaze-driven browsing system according to an embodiment of the present invention.

FIG. 1 is a diagram of a passive gaze-driven browsing system according to an embodiment of the present invention. A user 10 interacts with a browser 12 program operating on a computer system (not shown in FIG. 1) in the conventional manner. The browser may comprise a well-known browser program such as Internet Explorer™, commercially available from Microsoft Corporation, Netscape Navigator™, commercially available from Netscape Communications, Inc., or other program for obtaining and displaying web pages. The user may request the display of web pages and interact with the web pages as is known in the art.

In one embodiment, the eye gaze of the user may be tracked by gaze tracker 14 using a videoconferencing camera 16 and structured light. The purpose of an eye gaze tracker is to estimate the position on a display screen to where the user is fixating his or her gaze. This may be accomplished by tracking the user's pupil and the corneal glint, after a brief calibration procedure, and determining the mapping from coordinates of a pupil tracker to user screen coordinates. Assuming a static head, an eye can only rotate in its socket, and the surface of the eye may be approximated by a sphere. Since light sources may be used in the system that are also fixed, the glint of the cornea of the eye can be taken as a reference point, thus the vector from the glint to the center of the pupil will describe the gaze direction. To estimate the screen coordinates to where the user is looking, a second order polynomial transformation calculation may be used.

One application of the gaze tracker is to control a mouse pointer on a computer display using the user's eye gaze. Another application is to record the history of where the user has looked on the display screen during display of a web page. The screen coordinates determined by the gaze tracker may be communicated to other programs for representation on the display in various forms.

In one embodiment, infrared light emitting diodes (LEDs) that emit light in a range visible to the camera but not to the human eye may be arranged in two concentric rings to illuminate the user's face in alternating fashion (e.g., one ring lights up for every odd frame captured by the camera and the other ring lights up for every even frame). The alternate blinking takes advantage of the fact that the iris of the human eye is a narrow aperture that only reflects light back in a narrow beam aligned with the direction of the incident light. The rings may be placed around the camera lens such that only reflection from one ring is imaged at a time. The location of the iris may be computed by determining the difference between a pair of even and odd frames. Once the iris is located, the direction of gaze may be determined by the angle between the center of the iris and the corneal glint. In one embodiment, the gaze tracker provides an accuracy of +/−1 centimeter (cm) for a user approximately 50 cm away from a display surface (e.g., a computer monitor screen). The gaze tracker also works well with users wearing glasses.

In this embodiment, the gaze tracker may be implemented according to "Frame Rate Pupil Detector and Gaze Tracker", by C. H. Morimoto, D. Koons, A. Amir, and M. Flickner, published in the Proceedings of the Frame-rate Workshop, International Conference on Computer Vision, 1999, although other real-time gaze trackers that do not require structural light may also be employed.

Figure 2:
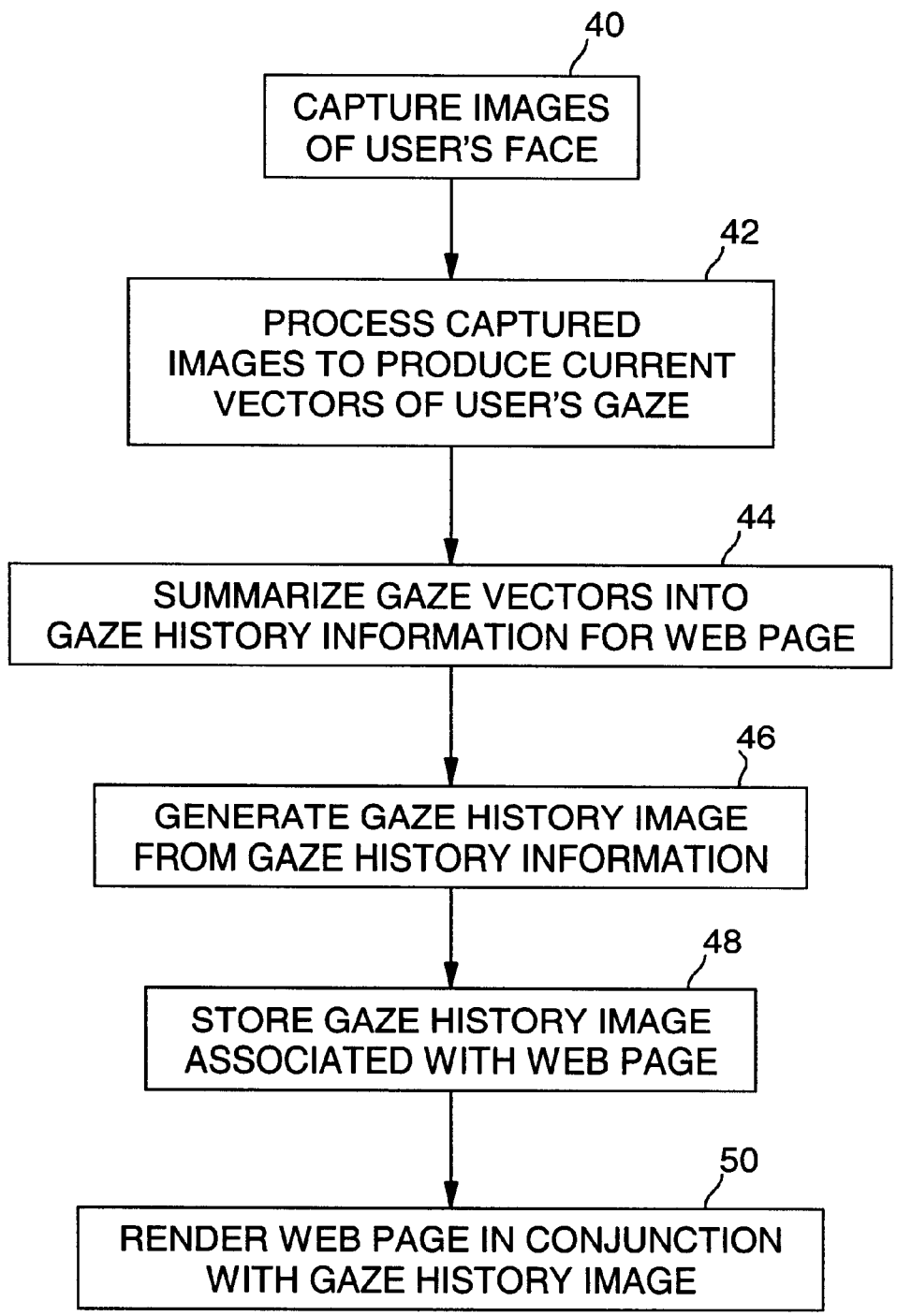
FIG. 2 is an example web page illustrating a gaze history of a browsing user according to an embodiment of the present invention.

As the user moves his or her eye gaze around the screen during web browsing, the screen coordinates for successive eye gaze data capture times may be forwarded as gaze vectors by gaze tracker 14 to gaze history generator 18. In one embodiment, for every frame captured by videoconferencing camera 16, the gaze tracker may provide the screen coordinates at which the user is looking at during that frame to the gaze history generator. In other embodiment, different intervals of captured frames may be used. Differences in gaze points from one frame to another define a gaze vector. The gaze history generator applies a summarization procedure to aggregate the stream of instantaneous gaze data (e.g., gaze vectors) into a single gaze history image for a particular web page being viewed. The gaze history image represents in a visual or graphic manner changes in the user's gaze at a web page over a period of time. In one embodiment, the locations where the user's gaze virtually intersected the web page on the display may be represented as a block or blob of color on or over the web page. FIG. 2 is an example web page illustrating a gaze history image of a browsing user according to an embodiment of the present invention. The dark line superimposed on the web page is a graphical representation of the change in user's gaze over time while the user was viewing the web page.

The gaze history generator may store the gaze history images in a gaze history database (DB). Web pages may be cached in a web page cache 22 accessible to the browser as is known in the art. The gaze history generator may correlate a gaze history image with each web page that has been viewed by the user and cause the browser to render the web page along with or in combination with the gaze history image as shown in the example of FIG. 2. In one embodiment, the gaze history generator may be implemented as a "plug-in" software component operating in conjunction with the browser. In one embodiment, the cached web page may be alpha blended with the gaze history image during rendering to illustrate the user's gaze history.

Figure 3:
FIG. 3 is a flow diagram illustrating operations of a passive gaze-driven browsing system according to an embodiment of the present invention.

FIG. 3 is a flow diagram illustrating operations of a passive gaze-driven browsing system according to an embodiment of the present invention. At block 40, the camera captures images of a user's face over time as the user is browsing. At block 42, the gaze tracker processes the captured images to produce current vectors of the user's gaze at the display screen. The screen coordinates of these gaze vectors may be forwarded to the gaze history generator. At block 44, the gaze history generator summarizes the gaze vectors into a gaze history for the current web page being viewed by the user. The gaze history may comprise a list of screen coordinate pairs (X1, Y1; X2, Y2; . . . ) representing successive changes in gaze. At block 46, the gaze history generator generates a gaze history image from the gaze history information. At block 48, the gaze history generator stores the gaze history image associated with the current web page into the gaze history database. Whenever the web page is viewed, the gaze history generator may update the gaze history image to reflect current viewing of the web page by the user. At block 50, the browser renders the web page in conjunction with the gaze history image to provide the user with a visual indication of where the user's gaze has been on the web page.

Although display of the gaze history image as a plurality of lines or curves may be useful to some users, it may also be distracting because of the lines on the web page representing the user's gaze. In another embodiment, the gaze history image may be modified to represent regions of the web page that have been viewed, rather than individual pixels, lines, curves or blobs. An image corresponding to the size of the whole web page being browsed may be tessellated into small regions. In one embodiment, each region may comprise one square centimeter of the web page, but other region sizes may also be used depending on the capabilities of the gaze tracker and/or gaze history generator. Alternatively, regions may be defined in terms of pixels (e.g., 10 pixels by 10 pixels). In this embodiment, each time the user's gaze lies in a particular region of the web page (and thus the corresponding image), the measure of novelty for the region may be progressively reduced. The measure of novelty of the region may be represented as an information theoretic metric. Novelty may be represented as 1.0, for example, and every time the user views the information the metric may be reduced by 0.25 for example. Thus, as information is viewed, the novelty may be reduced by a predetermined amount. Hence, an array of metrics (one metric per region) may be attached as ancillary data to the cached web page so that regions of the web page may be masked to "gray-out" regions of the page that have already been viewed by the user. In one embodiment, the more times a user views a particular region of the page, the darker or more opaque it may become (proportionally to this information theoretic metric). In another embodiment, once a user has seen a region, it may be completely erased or blacked out. Generally, the appearance of portions of the web page may be modified based on the gaze history image in terms of one or more of color, brightness and contrast. Also, the appearance of the portions of the web page may be modified based on the frequency of gaze by the user at those portions of the web page.

Figure 4:
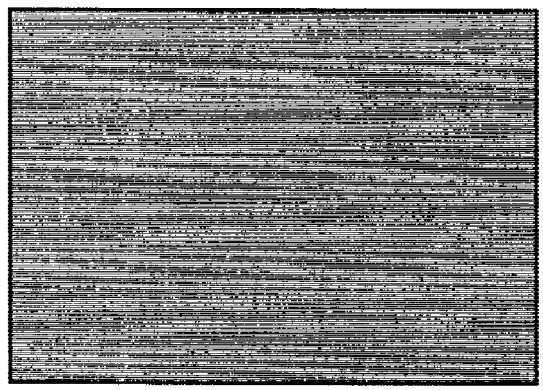
FIG. 4 is a diagram of shaded blocks that may be mixed with a web page to represent reviewed data according to an embodiment of the present invention.
Figure 4:
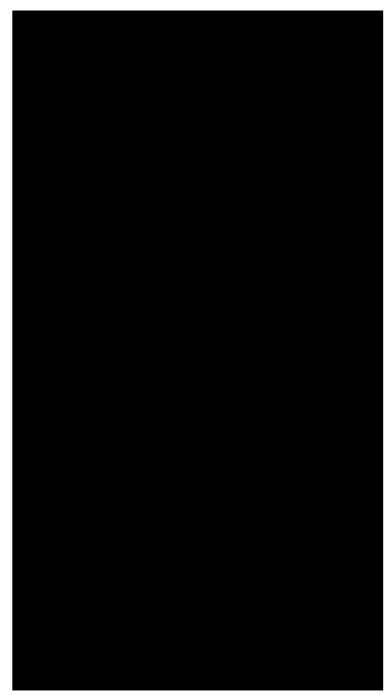

Using the example of FIG. 2, one can see how the user's gaze moved around the web page according to the gaze history and how this information may be used to modify the display of a web page. The first group of regions on the center left portion of page where the user read a short news article may correspond to a light gray rectangle in the gaze history image as shown in FIG. 4, instead of a long continuous line. The size of the light gray rectangle corresponds to those regions gazed at by the user that were contiguous or grouped according to selected criteria. In this example, the shape of the first group of regions is a rectangle, but in other examples or embodiments, other shapes may be used. Since the user's gaze was located in this group of regions for some measurable time, an information theoretic metric may be summed or otherwise aggregated for each of the affected regions to arrive at a total metric value for the group of regions. This total metric value may then be used to set the gray scale value (or other obscuring visual attribute) for this group of regions in the gaze history image. In another example, suppose that the second group of regions on the center right portion of the page where the user looked at the photo of the baseball pitcher and scanned other news headlines received more attention from the user (e.g., more eye gaze). Therefore, the total metric value for the second group of regions may be higher (or lower, depending on the scale used). If the total metric value is higher, then the gray scale value for the second group of regions in the gaze history image may be set differently as shown in the right hand rectangle of FIG. 4, so as to subsequently further darken the underlying web page image.

Figure 5:
FIG. 5 is the example web page of FIG. 2 after combination with a gaze history image according to an embodiment of the present invention.

FIG. 5 illustrates the example web page of FIG. 2 after combination with gaze history images according to an embodiment of the present invention. As can be seen in FIG. 5, once the user has viewed certain regions of the web page, these regions of the web page may be modified to reflect the attention already given to these regions by the user's gaze. Accordingly, the gray scale of these regions in the gaze history image may be modified. By "graying our" the previously read or viewed regions, they are made unobtrusive to the user. As a result, only previously unviewed information tends to catch the eye of the user, thereby increasing the user's browsing efficiency and mitigating information overload. Although both groups of regions are shown in the example of FIG. 5 having a substantially similar gray scale effect, varying degrees of opaqueness or "graying out" may be applied to different regions of the web page during rendering, depending on the total metric values of different groups of regions.

Although the examples discussed herein relate to web browsing, the present invention may also be applicable in other information browsing domains other than Internet portals. For example, air traffic controllers may be reminded selectively of eventful regions of the display screen not being looked at. Browsing text documents in a text editor may also benefit from a similar passive focusing mechanism.

When historic and instantaneous gaze information is available, web page advertisements could be modified in many ways using the present invention. One technique would be to have advertising animation in a banner be triggered by the gaze of the user. When the user looks at the ad, the ad changes its appearance in response. Another technique would be to have placement of a banner ad in a web page driven by historic browsing data. For example, every time that a user visits an information portal, the banner would be displayed in a different region of the page according to historic gaze data saved in the gaze history database. A third and more intrusive intervention would cause the banner to disappear after being looked at, or dynamically appear to jump closer to the user's gaze if the banner ad is not viewed at all.

In the preceding description, various aspects of the present invention have been described. For purposes of explanation, specific numbers, systems and configurations were set forth in order to provide a thorough understanding of the present invention. However, it is apparent to one skilled in the art having the benefit of this disclosure that the present invention may be practiced without the specific details. In other instances, well-known features were omitted or simplified in order not to obscure the present invention.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system embodying the playback device components includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a removable storage media or device (e.g., floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 6:
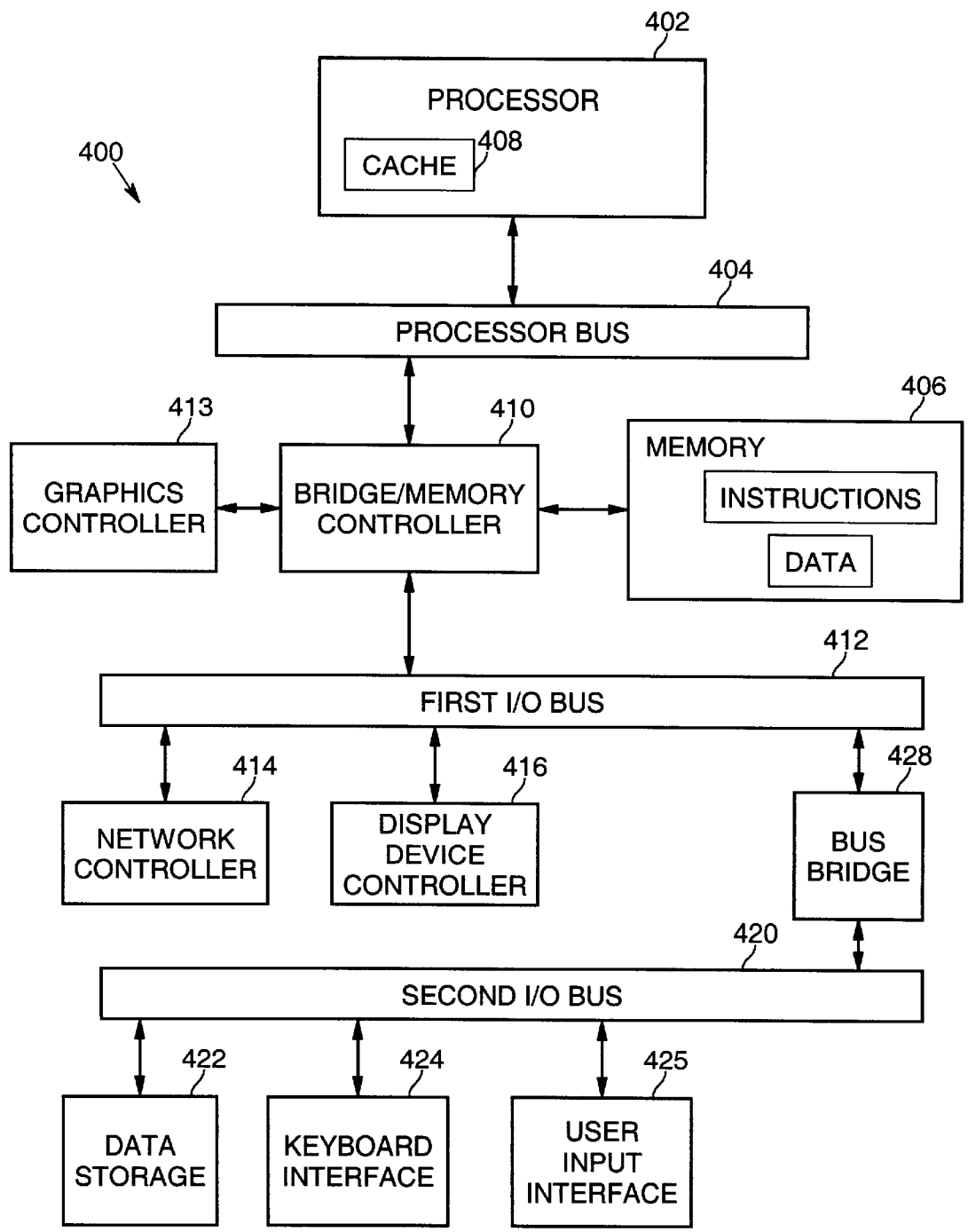
FIG. 6 is a diagram illustrating a system capable of supporting a passive gaze-driven browsing system according to an embodiment of the present invention.

An example of one such type of processing system is shown in FIG. 6, however, other systems may also be used and not all components of the system shown are required for the present invention. Sample system 400 may be used, for example, to execute the processing for embodiments of the passive gaze-driven browsing system, in accordance with the present invention, such as the embodiment described herein. Sample system 400 is representative of processing systems based on the PENTIUM® II, PENTIUM® III, PENTIUM® 4 and CELERON™ microprocessors available from Intel Corporation, although other systems (including personal computers (PCs) having other microprocessors, engineering workstations, other set-top boxes, and the like) and architectures may also be used.

FIG. 6 is a block diagram of a system 400 of one embodiment of the present invention. The system 400 includes a processor 402 that processes data signals. Processor 402 may be coupled to a processor bus 404 that transmits data signals between processor 402 and other components in the system 400.

System 400 includes a memory 406. Memory 406 may store instructions and/or data represented by data signals that may be executed by processor 402. The instructions and/or data may comprise code for performing any and/or all of the techniques of the present invention. Memory 406 may also contain additional software and/or data (not shown). A cache memory 408 may reside inside processor 402 that stores data signals stored in memory 406.

A bridge/memory controller 410 may be coupled to the processor bus 404 and memory 406. The bridge/memory controller 410 directs data signals between processor 402, memory 406, and other components in the system 400 and bridges the data signals between processor bus 404, memory 406, and a first input/output (I/O) bus 412. In this embodiment, graphics controller 413 interfaces to a display device (not shown) for displaying images rendered or otherwise processed by the graphics controller 413 to a user.

First I/O bus 412 may comprise a single bus or a combination of multiple buses. First I/O bus 412 provides communication links between components in system 400. A network controller 414 may be coupled to the first I/O bus 412. In some embodiments, a display device controller 416 may be coupled to the first I/O bus 412. The display device controller 416 allows coupling of a display device to system 400 and acts as an interface between a display device (not shown) and the system. The display device receives data signals from processor 402 through display device controller 416 and displays information contained in the data signals to a user of system 400.

A second I/O bus 420 may comprise a single bus or a combination of multiple buses. The second I/O bus 420 provides communication links between components in system 400. A data storage device 422 may be coupled to the second I/O bus 420. A keyboard interface 424 may be coupled to the second I/O bus 420. A user input interface 425 may be coupled to the second I/O bus 420. The user input interface may be coupled to a user input device, such as a remote control, mouse, joystick, or trackball, for example, to provide input data to the computer system. An audio controller 427 may be coupled to the second I/O bus for handling processing of audio signals through one or more loudspeakers (not shown). A camera (not shown) may also be coupled to the system. A bus bridge 428 couples first I/O bridge 412 to second I/O bridge 420.

Embodiments of the present invention are related to the use of the system 400 as a passive gaze-driven browsing system. According to one embodiment, such processing may be performed by the system 400 in response to processor 402 executing sequences of instructions in memory 404. Such instructions may be read into memory 404 from another computer-readable medium, such as data storage device 422, or from another source via the network controller 414, for example. Execution of the sequences of instructions causes processor 402 to execute gaze-driven browser processing according to embodiments of the present invention. In an alternative embodiment, hardware circuitry may be used in place of or in combination with software instructions to implement embodiments of the present invention. Thus, the present invention is not limited to any specific combination of hardware circuitry and software.

The elements of system 400 perform their conventional functions in a manner well-known in the art. In particular, data storage device 422 may be used to provide long-term storage for the executable instructions and data structures for embodiments of passive gaze-driven browsing system in accordance with the present invention, whereas memory 406 is used to store on a shorter term basis the executable instructions of embodiments of the passive gaze-driven browsing system in accordance with the present invention during execution by processor 402.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method for efficiently viewing information comprising:
    displaying information on a display;
    passively tracking changes in a user's eye gaze while the user is browsing the information shown on the display during a first viewing session;
    generating a gaze history image from the gaze changes;
    storing the gaze history image as a record of historical information about the user's direction of gaze while viewing the information during the first viewing session; and
    redisplaying the information on the display in a second viewing session by modifying the appearance of the information on the display based on the stored gaze history image generated during the first viewing session.

2. The method of claim 1, wherein the information comprises data on a web page.

3. The method of claim 1, wherein passively tracking changes in the user's eye gaze comprises:
    capturing a series of images of the user's face;
    analyzing the images to generate vectors of the user's gaze, the vectors representing an eye gaze change from one point on the display to another; and
    summarizing the vectors into a gaze history for the user for the displayed information.

4. The method of claim 1, wherein generating a gaze history image comprises:
    representing the gaze changes in a graphical manner as a gaze history image; and
    associating the gaze history image with the displayed information.

5. The method of claim 1, wherein modifying the presentation of the information comprises:

rendering the information and the gaze history image on the display in combination such that display of the gaze history image modifies the appearance of the displayed information.

6. The method of claim 1, wherein modifying the appearance of the displayed information comprises modifying at least one of the color, brightness, contrast, and location of the displayed information.

7. The method of claim 1, wherein the gaze history image comprises a plurality of at least one of lines, curves, and colored rectangles.

8. The method of claim 1, further comprising progressively fading out visibility of the displayed information based on changes in the gaze history image.

9. The method of claim 1, wherein the information comprises an advertisement and at least one of animation, appearance, and placement of the advertisement on the display is modified based on the gaze history image.

10. The method of claim 1, further comprising modifying presentation of the information on the display based on the frequency of gaze at the information by the user.

11. An article comprising: a storage medium having a plurality of machine readable instructions, wherein when the instructions are executed by a processor, the instructions provide for passive gaze-driven browsing by displaying information on a display, passively tracking changes in a user's eye gaze while the user is browsing the information shown on the display during a first viewing session, generating a gaze history image from the gaze changes, storing the gaze history image as a record of historical information about the user's direction of gaze while viewing the information during the first viewing session, and redisplaying the information on the display in a second viewing session by modifying the appearance of the information on the display based on the stored gaze history image generated during the first viewing session.

12. The article of claim 11, wherein the information comprises data on a web page.

13. The article of claim 11, wherein instructions for passively tracking changes in the user's eye gaze comprise instructions for capturing a series of images of the user's face, analyzing the images to generate vectors of the user's gaze, the vectors representing an eye gaze change from one point on the display to another, and summarizing the vectors into a gaze history for the user for the displayed information.

14. The article of claim 11, wherein instructions for generating a gaze history image comprise instructions for representing the gaze changes in a graphical manner as a gaze history image, and associating the gaze history image with the displayed information.

15. The article of claim 11, wherein instructions for modifying the presentation of the information comprise instructions for rendering the information and the gaze history image on the display in combination such that display of the gaze history image modifies the appearance of the displayed information.

16. The article of claim 11, wherein instructions for modifying the appearance of the displayed information comprise instructions for modifying at least one of the color, brightness, contrast, and location of the displayed information.

17. The article of claim 11, wherein the gaze history image comprises a plurality of at least one of lines, curves, and colored rectangles.

18. The article of claim 11, further comprising instructions for progressively fading out visibility of the displayed information based on changes in the gaze history image.

19. The article of claim 11, wherein the information comprises an advertisement and at least one of animation, appearance, and placement of the advertisement on the display is modified based on the gaze history image.

20. The article of claim 11, further comprising instructions for modifying presentation of the information on the display based on the frequency of gaze at the information by the user.

21. A system for passive gaze-driven browsing of information shown on a display comprising:

a browser to display information on a display;

a gaze tracker to passively track changes in a user's eye gaze while the user is browsing the displayed information during a first viewing session; and a gaze history generator to generate a gaze history image from the gaze changes, to store the gaze history image as a record of historical information about the user's direction of gaze while viewing the information during the first viewing session, and to redisplay the information on the display in a second viewing session by causing modification of the appearance of the information on the display based on the stored gaze history image generated during the first viewing session.

22. The system of claim 21, further comprising a browser and an information cache, wherein the browser receives the information from the information cache and the gaze history image from the gaze history generator, and renders the information and the gaze history image on the display.

23. The system of claim 22, wherein the information comprises data on a web page and the information cache comprises a web page cache.

24. The system of claim 21, wherein the gaze tracker captures a series of images of the user's face, analyzes the images to generate vectors of the user's gaze, the vectors representing an eye gaze change from one point on the display to another; and summarizes the vectors into a gaze history for the user for the displayed information.

25. The system of claim 21, wherein the gaze history generator represents the gaze changes in a graphical manner as a gaze history image, and associates the gaze history image with the displayed information.

26. The system of claim 21, wherein the information comprises an advertisement and at least one of animation, appearance, and placement of the advertisement on the display is modified by the browser based on the gaze history image.

27. The system of claim 21, further wherein the gaze history generator causes the modification of presentation of the information on the display based on the frequency of gaze at the information by the user.

* * * * *